UNITED STATES PATENT OFFICE.

PAGET HIGGS, OF NEW YORK, N. Y., ASSIGNOR TO JAMES C. REED, OF SAME PLACE.

ELECTRO-DEPOSITION OF METAL.

SPECIFICATION forming part of Letters Patent No. 244,234, dated July 12, 1881.

Application filed February 14, 1881. (No specimens.)

*To all whom it may concern:*

Be it known that I, PAGET HIGGS, a subject of Great Britain, residing at New York city, in the county and State of New York, have invented a new and useful Improvement in the Electric Deposition of Metal, of which the following is a true specification.

My invention relates to the process of separating metals from their ores, by means of an electric current, while such ores are in a state of fusion, and it has for its object to promote the action of the current, rendering it more effective, so that metals which it has heretofore been found impracticable to reduce by this method may be economically separated from their ores, and in the case of other metals which have been so reduced the operation can be carried on with a less powerful current and therefore more economically than hitherto.

I have discovered that the element boron and its compounds have also the property of promoting the action of the electric current when the fused ore is treated as an electrolyte; and my invention consists in the process hereinafter described, and specifically claimed, whereby I avail myself of this fact. While the action of these substances to which I refer is altogether distinct from their proper flux action, still in treating many ores which are intractable to heat, it will be advantageous to make use of both properties of the flux by combining it with the ore before fusion; but while this may be done, it will be found that if these same ores were fused without the aid of the flux they would then be practically irreducible under the action of the current until the flux is added, and that then the metal will easily separate from the ore, going to the cathode of the bath, and that if the flux were used without the aid of electrolysis there would be no reduction of the metal. I have further discovered that the foregoing action is promoted when the flux is used in such proportions to the amount of metal in the ore to be reduced as will be capable of producing a definite chemical compound with the metal—as, for example, in the reduction of carbonates of copper, using borax or boracic acid, I find that the best results are produced when the flux is introduced in the quantity proper to form with the copper contained in the ore a chemical compound—say borate of copper; but in practice there may be used a certain excess of the flux that would maintain a saturated condition of the compound.

To enable others to carry out my process, I will describe it as applied in one particular instance—that is, in the reduction of aluminium from one of its ores—say, cryolite.

Into an earthenware crucible exposed to a heat of about 1000° centigrade I gradually introduce cryolite and borax in proportions regulated by the above principle, maintaining the heat until the compound is reduced to a thoroughly and uniformly fused condition. The heat should then be reduced to about 900° centigrade. I then introduce two electrodes, preferably of retort-carbon, and by their means and suitable connections with an electric generator pass a current through the fusing mass. The result will be that aluminium will be deposited at the cathode in a pure state in speculæ or globules, according to the strength of the current. These particles of the metal will fall to the bottom of the crucible, (or if the cathode were introduced from the bottom would originally settle there,) and when the amount of available metal has been deposited the temperature may be again raised to 1000° centigrade and the metallic mass fused together. More ore might then be added and the process continued; but I find it more economical to then pass on to another bath which has been heating during the electrolysis of the first, which may be emptied and its residium lixiviated for the preservation of its soluble constituents.

Other ores of aluminium may be treated in the same way, and by this process I have succeeded in gaining that metal at a cost far below that at which it has heretofore been practicable to produce it. Carbonates of copper may be produced by the same process, boracic acid being used as the agent to promote the electrolytic action, and in the same way other ores of copper, which are refractory and dissolve with difficulty—magnesium, chromium, platinum, some iron and other ores—may be successfully and economically subjected to the electrolytic action.

While I have mentioned in the foregoing specification the element boron and its compounds as the agent which I find best to employ, as above described, I do not wish to be confined to that substance, as there are certain equivalent fluxes which will, to a certain extent, perform the same functions. Thus I can reduce iron ore by electrolysis with the aid of sand, silicon being probably next in quality to boron as a reagent, using the sand in the same manner as I have above described with regard to borax, and in such proportions as to be capable of forming a silicate of iron with the metal in the ore. I believe that iron might be obtained from its slag by this process. On the other hand, while the substances which would be equivalent to the boron belong to the class of fluxes, I do not wish to be understood as stating that all of those substances can be used in that way. For instance, I am aware that it has been proposed to use common salt (chloride of sodium) in the electrolysis of cryolite; but it is not equivalent to borax, because it becomes decomposed at a temperature lower than the fusing-point of the ore, forming chlorides, which interfere with the separation of the metal.

In speaking of the equivalents of borax it will be understood therefore that I do not include those fluxes which decompose at such low temperatures. The action of the borax or boracic acid I attribute to the presence of the element boron, and I should regard this element in any of its forms or compounds as equivalent to the borax or boracic acid in the process above described, although, of course, in particular applications of it some specific form or compound will be found most practicable, as will be suggested to any person skilled in the art.

What I claim, and desire to secure by Letters Patent, is—

1. The process of obtaining metals from their ores, which consists in treating with the electric current an electrolytic compound of a fused ore combined with borax or its equivalent, substantially as described.

2. The process of obtaining aluminium from its ores, which consists in subjecting the fused ore, combined with borax or its equivalent, to the action of the electrolytic current, substantially as described.

3. The process of obtaining aluminium from its ores, which consists in subjecting the fused ore, combined with borax or its equivalent, to the action of the electrolytic current, the borax being introduced in such proportions as to form a borate of the metal.

PAGET HIGGS.

Witnesses:
WYLLYS HODGES,
WM. HILLIARD.